United States Patent [19]

White

[11] 4,454,088
[45] Jun. 12, 1984

[54] METHOD OF MOLDING A LOW FRICTION BEARING

[76] Inventor: Charles S. White, 35815 42nd St., Palmdale, Calif. 93550

[21] Appl. No.: 376,787

[22] Filed: May 10, 1982

Related U.S. Application Data

[62] Division of Ser. No. 132,267, Mar. 20, 1980.

[51] Int. Cl.$^3$ .............................. B29B 1/02; C10H 7/28
[52] U.S. Cl. ..................................... 264/115; 252/12.6; 264/103; 264/122; 264/127; 264/136; 264/143
[58] Field of Search .............. 264/115, 122, 126, 127, 264/143, 103, 136; 252/12, 12.4, 12.6

[56] References Cited

U.S. PATENT DOCUMENTS

| | | | |
|---|---|---|---|
| 2,862,350 | 12/1958 | King et al. | 264/103 X |
| 3,037,893 | 6/1962 | White | 252/12.6 |
| 3,120,960 | 2/1964 | Pippert et al. | 264/103 X |
| 3,341,211 | 9/1967 | Houghton et al. | 264/103 X |
| 3,646,182 | 2/1972 | Ferch | 264/115 |
| 3,781,205 | 12/1973 | Cairns et al. | 252/12.4 X |
| 3,908,038 | 9/1975 | Nienart et al. | 252/12 X |
| 3,947,611 | 3/1976 | White | 427/369 |
| 4,080,233 | 3/1978 | McCloskey et al. | 252/12.4 X |
| 4,137,618 | 2/1979 | Krauss | 264/136 X |
| 4,209,480 | 6/1980 | Homsy | 264/122 X |

Primary Examiner—Donald E. Czaja
Assistant Examiner—James C. Housel
Attorney, Agent, or Firm—D. Peter Hochberg

[57] ABSTRACT

A composition comprising a chopped, bondable low friction yarn which is made by twisting together filaments of low friction material with filaments of bondable material and by impregnating the yarn with a bonding resin. A low friction bearing, and a process for manufacturing the same, involving the molding of bondable low friction yarn which has been chopped into small pieces, is also disclosed.

6 Claims, 8 Drawing Figures

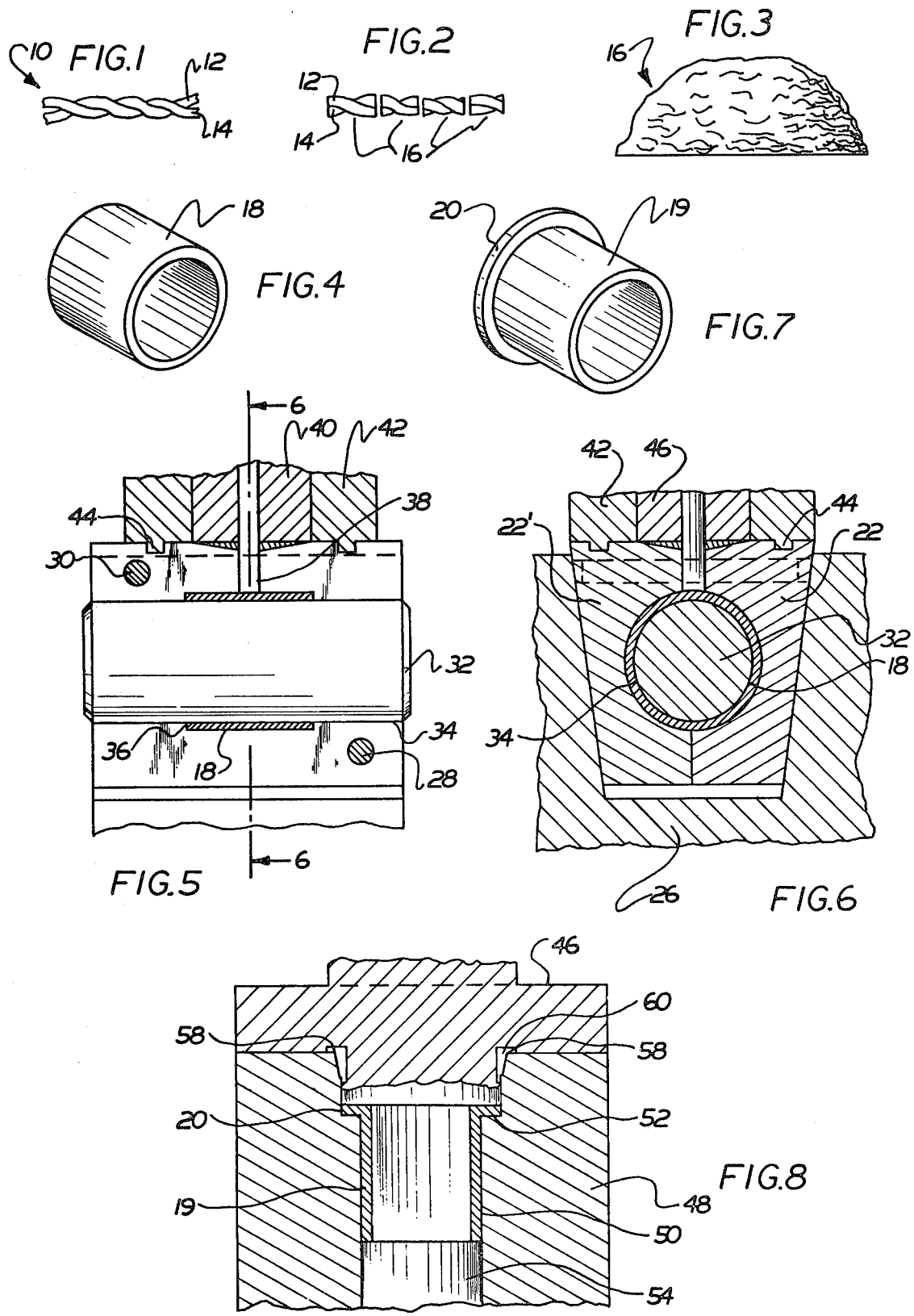

METHOD OF MOLDING A LOW FRICTION BEARING

This application is a division, of application Ser. No. 132,267, filed Mar. 20, 1980.

BACKGROUND OF THE INVENTION

This invention relates to compositions which are mixtures of low friction materials and bondable materials and which are impregnated with bonding resins, and to bearings made from such compositions.

The prior art discloses low friction bearings made from mixtures of low friction materials and bondable materials, which mixtures are treated with bonding resins. U.S. Pat. No. 3,781,205 to Cairns & Walton discloses a bearing with a surface made from a combination of a solid lubricant and fibers which add dimensional stability. There is disclosed in U.S. Pat. No. 3,572,863 to Josephson a bearing made from a combination of asbestos fibers, phenol-formaldehyde resin, nitrate rubber, and a lubricant such as polytetrafluoroethylene. A bearing material made by applying a finely divided low friction material to fibrous substrate is described in U.S. Pat. No. 3,480,547 to Van Dyk. U.S. Pat. No. 3,464,845 to Osborn & Gobran discloses a bearing made from polyethylene sulfide resin and polytetrafluoroethylene and optionally other filler materials.

Such composite low friction bearings are often formed by molding. The following United States patents disclose bearing compositions that may be molded:

| U.S. Pat. No. | Inventor |
| --- | --- |
| 3,994,814 | Cairns |
| 3,985,661 | Ikeda & Ishikawa |
| 3,908,038 | Neinart, Saunders & Jeges |
| 3,879,301 | Cairns |
| 3,779,918 | Ikeda & Kawakita |
| 3,583,913 | Courtney |
| 3,455,864 | Dodson & White |
| 3,000,846 | Runton, Haddam & Morton |

In such bearings there is a tendency of the low friction material and bondable material to separate from each other. In addition, it is desirable to have the low friction material and bondable material well mixed so as to give a rather uniform distribution of materials throughout the bearing.

BRIEF DESCRIPTION OF THE DRAWINGS

FIG. 1 is a perspective view of the bondable low friction yarn used in the present invention.

FIG. 2 is a perspective view of the yarn of FIG. 1 chopped to size.

FIG. 3 is a quantity of the chopped yarn of FIG. 2.

FIG. 4 is a perspective view of the molded low friction bearing of the present invention employing a quantity of chopped, bondable low friction yarn.

FIG. 5 is a sectional view of a molding apparatus for forming the low friction bearings of the present invention.

FIG. 6 is a side sectional view of FIG. 5 taken along lines 6—6.

FIG. 7 is an alternative low friction bearing of the present invention.

FIG. 8 is a sectional view of a high production molding apparatus molding the low friction bearing of the present invention.

SUMMARY OF THE INVENTION

It is an object of this invention to provide an improved composition of mixed low friction material and bondable material.

It is a further object of this invention to provide a composition for molded low friction bearings and the like with a high degree of cohesiveness, strength, and wearability.

It is also an object of this invention to provide molded low friction bearings having a high degree of cohesiveness, strength, and durability.

Another object of this invention is to provide a molding process for making low friction bearings with a high degree of cohesiveness, strength, and wearability.

It is yet another object of this invention to provide a process for high volume production of low friction bearings.

Further objects of the invention are to provide improved bearing materials, bearings and processes for making the same, which are economical, practicable and effective in use.

Other objects will be apparent to those skilled in the art to which the invention pertains from the description to follow and from the appended claims.

The foregoing objects are achieved according to preferred embodiments of the invention by the provision of a bearing composition comprising a chopped, bondable low friction yarn. The yarn is made by twisting together filaments of low friction material and bondable material, and by impregnating the yarn with a bonding resin. After the yarn is chopped up, it is molded to form bearings of the desired shape. Such molded low friction bearings made from chopped yarn have low friction materials and bondable materials fastened together and uniformly distributed throughout the bearing. This intimate mixing of the components results in a cohesive, strong, and long wearing bearing.

DESCRIPTION OF THE PREFERRED EMBODIMENTS

This invention concerns a composition of chopped, bondable low friction yarn and the production of molded low friction bearings from that composition. Preferably, the yarn is a composite made from Teflon (trademark of DuPont for polytetrafluoroethylene) and Nomex (trademark of DuPont for polyamide fiber). Bearings made entirely of Teflon tend to fall apart and lose cohesiveness because of the well known difficulty of bonding Teflon. Thus, bondable materials are added. However, I have improved upon prior art methods by making bearings from bondable low friction yarn made by twisting low friction fibers together with bondable fibers. The yarn is then chopped and, finally, molded. Because the low friction material and the bondable material are twisted together, they do not tend to separate and they are uniformly distributed throughout the bearing. The result is a bearing with strength and durability.

The making of bearings from woven or knit low friction fabrics, rather than the molding of chopped yarn, is disclosed in this inventor's application Ser. No. 132,268 filed Mar. 20, 1980 for A Stamped Low Friction Bearing And Process And Apparatus For Making Same and Ser. No. 132,263 filed Mar. 20, 1980 for Hot Drawn Low Friction Bearing.

By "bondable low friction yarn" is meant a yarn comprised of low friction filaments and bondable filaments. By "bondable" is meant that the yarn has the ability to be further bonded. The yarn is bondable because it is a twisted thread containing bondable filaments and low friction filaments and therefore has the capability of being bonded when the yarn is impregnated with a bonding resin.

The low friction filaments can be fluorinated hydrocarbons, including fluorinated polyethylene derivatives such as polytetrafluoroethylene, or any other material which has the desirable low friction properties, such as polychlorotrifluoro ethylene, polyvinylidene fluoride, and the like. Preferably the low friction filaments are Teflon filaments.

The bondable filaments which are employed with the low friction filaments in order to make up the desired bondable low friction yarn, can be made of the following materials: polyester such as Dacron (Trademark of DuPont for polyester fiber), cotton, acrylic, polyamide such as nylon, Nomex, methacrylic, graphite such as Thornel (Trademark of DuPont for graphite fiber), and the like. Lengths of bundles of filaments of the low friction material are formed into a twisted thread or as a braided thread. The composite yarn is formed by twisting the low friction thread together with the bondable filaments or with thread made of bondable filaments. Suitable bondable low friction yarns are composed of Teflon (200 or 400 denier) and Nomax (200 or 400 denier).

The most preferred yarn (for insertion into the molding equipment) is one where the amount of Teflon contained therein is approximately up to 50% by weight, more preferably from about 10% to about 50%, with the remaining portion being the bondable material. The most preferred yarn is one containing 200-denier Teflon twisted about eight turns per inch with a 100-denier nylon or Nomex, the twisted yarn being heatset to keep the twist in place.

Preferably, the yarn is coated or impregnated with a bonding resin by passing the yarn through a resin tank to immerse the yarn in the desired resin. If a thermosetting resin is used, it should be cured to the B-stage after impregnating the yarn. By "B-stage" is meant that substantially all of the solvent has been driven off by the application of heat, and the resin alone remains in an essentially non-tacky yet incompletely cured condition. In other words, the resin that is impregnated in the yarn is preferably in a solidified yet thermoplastic state with a substantial amount of the solvent removed. For a description of a preferred process for impregnating a low friction yarn, see U.S. Pat. No. 3,947,611 to this inventor, which is incorporated herein by reference. In that process the yarn is impregnated with the bonding resin by passing the thread through the bonding resin which is an aqueous solution, preferably about 50% solids, and then cured to the B-stage. The yarn is then wound on spools, ready for subsequent processing in accordance with the present invention. Alternately, the yarn can first be chopped and then mixed in a slurry of the bonding resin. If this method is used, the resin is preferably dry and substantially free of solvent before insertion into the molding equipment.

The resin that can be employed for impregnating the low friction yarn is any one which will bond the filaments to each other. Preferably the resin is a thermosetting resin such as phenol, epoxy, polyester, urea, diacryl pythalate, ureaformaldehyde, urethane, melamine-formaldehyde, and the like. Phenol-formaldehyde is most preferred.

A thermoplastic resin can also be employed provided that the temperature at which the resin has a tendency to flow is substantially higher than the operating temperature of the resulting low friction bearing of the present invention.

If the bearing is to be subjected to high temperature, one can choose to employ an appropriate high temperature resin or adhesive. Such resins are polyamide, polyacetal, polycarbonate, polyethylene, acrylonitrite, butadiene, styrene, and the like. Epoxy, phenolic, epoxy novolac, amide-imides, polyimides, and polybenzimidazole are discussed in *Machine Design*, May 15, 1969 issue, pages 174–178, which is incorporated herein by reference. A preferred high temperature resin is Pyralin (trademark for DuPont for a polyimide).

In the case of thermoplastic resins, if impregnation of the yarn is carried out with the thermoplastic in a solvent solution, the solvent should be removed before the yarn is wound onto spools for subsequent use. If chopped yarn is mixed with a slurry of thermoplastic resin to impregnate the twisted yarn, the resin should be substantially dry and substantially free of solvent before insertion into the molding equipment.

The resin, whether a thermoset or thermoplastic resin, that is utilized in the present invention is characterized as being in a "solidified yet thermoplastic" state (having the property of softening or fusing when heated and of hardening again when cooled) on the yarn following impregnation. This is intended to characterize a thermosetting resin which has been cured to the B-stage, as well as a true thermoplastic resin which may be softened by heating. Since the resin, after it is impregnated into the thread, is in "solidified yet in a thermoplastic" state, the resin is solid within the yarn, yet it is softened or fused when later heated and hardened again when cooled. This is true of thermosetting resins because the resin is impregnated into the yarn and the resin is then in the B-stage. Thereafter, in final curing, additional heat will cause the thermosetting resin to fuse and finally solidify to its fully cured state sometimes called the "C-stage." In this invention, the C-stage is reached during molding. Either type of resin will during molding soften and coalesce to form a continuous matrix about and through the bondable low friction yarn. In the case of a thermosetting resin, heat and pressure required to mold will cause the resin on the yarn to first soften and coalesce into a continuous matrix, and as the polymerization proceeds, the resin assumes its normal solidified cross-linked character. In the case of a thermoplastic resin, the heat and pressure used to mold the yarn will effect a softening coalescence of thread to a continuous matrix which upon cooling will solidify and effect the bonding of the threads to each other.

It is to be understood that the disclosure concerning the coating for the yarn, including curing, is really suggestive of the process for resin coating the thread. The important criterion is that the thread be thoroughly and uniformly coated, and, in the case of a thermosetting resin, cured to the B-stage, before it is subsequently processed.

The yarn, when chopped, is composed of pieces about ¼ or 1/16 inches in size. The relative size of the chopped yarn can be varied. The smaller the pieces, the easier it will be to process the material in the molding equipment; however, the longer the pieces, the more cohesiveness the bearing will have.

The preferred molding composition to be actually placed in the molding machine, contains between 30% and 50% by weight of resin, and the remaining portion (70% to about 50%) being the yarn. Such yarn contains about 10% to about 50% by weight Teflon.

Turning now to a description of the drawings, FIG. 1 describes the bondable low friction yarn 10 which is comprised of low friction filaments 12 and bondable filaments 14 which are twisted with each other and heatset. Preferably, the yarn threads are twisted at a twist multiplier of about eight turns per inch and heatset. The yarn is then cut or chopped into the pieces of chopped, bondable low friction yarn 16 of the desired length of, preferably about 1/16th of an inch to ¼ of an inch as shown in FIG. 2. A quantity of pieces of chopped, bondable low friction yarn 16 is shown in FIG. 3, a portion of which will be used in a piece of molding equipment, such as injection molding or transfer molding equipment.

A low friction bearing 18 of a cylindrical shape is shown in FIG. 4, and a T-shaped bearing having a cylindrical section 19 and an outwardly facing, peripheral flange 20 is shown in FIG. 7, although it should be understood that bearings of many shapes can be produced according to the invention.

FIGS. 5 and 6, show one type of equipment that may be used to mold a low friction bearing according to the invention. A pair of die inserts 22 and 22' are seated within a die holder 26 and are maintained in position by dowels 28 and 30. A mandrel 32 fits within a seat 34 formed by the die inserts. A mold cavity 36 is thereby formed and is constructed to be of a desired shape for the molding of the low friction bearing 18 which is shown in the molded condition in the mold cavity 36 in FIGS. 5 and 6. A plunger cavity 38 is in communication with the mold cavity 36. A plunger (not shown) is received within the plunger cavity 38. The plunger is held in place by holding means 40. A threaded ring 42 securely fastens the holding means 40 to the die inserts 22, 22' by engaging recess area 44 in the die inserts.

During the preparation of the low friction bearing, a quantity of the chopped, bondable low friction yarn 16 is inserted in the plunger cavity 38. The plunger forces the quantity of yarn into the mold cavity 36. The pressing generates some heat, but, preferably additional heat is applied as the yarn presses into the cavity. The temperature employed during molding is sufficiently high to cause the bonding resin, which has impregnated the low friction yarn, to soften and the composition to take on the configuration shown in FIGS. 5 and 6, that is, the low friction bearing 18 of the molded shape. The molded bearing 18 is shown in the final stages of the molding operation in FIGS. 5 and 6.

Preferably, high volume molding equipment is used to facilitate the bearings described herein. The high volume molding equipment shown in FIG. 8 is used for making T-shaped bearings 19 having an outwardly facing peripheral flange 20. A die insert 48 having a body section 50 and a T-shaped flange area 52 is used in combination with a plunger 46, shown as partially cut away in FIG. 8. The configuration of the cavity of the die insert corresponds to the desired outer configuration of the bearing. The outer configuration of the lower part of the plunger corresponds to the desired inner configuration of the bearing. The die insert 48 has chamfer edges 58 to provide a recess area 60 between the plunger and the die insert even when the plunger is fully inserted into the die. A knockout pin 54 is also provided at the bottom of the die insert.

The bearing is formed by inserting the chopped, bondable low friction yarn material into the cavity of the die insert. The plunger 46 is then lowered to force the yarn material against the inside of the die insert. Any gases formed during the molding operation are allowed to escape through the recess area 60. The temperature employed during molding is sufficient to cause the bonding resin to soften and allow the chopped, bondable low friction yarn material to flow and to take on the desired configuration as defined by the die insert and plunger. Finally, the knockout pin 54 pushes out the finished bearing after the plunger is removed.

The preferred embodiments as described herein fulfill the objects of the invention. Disclosed is an improved composition of mixed low friction material and bondable material. Also disclosed is a molded low friction bearing made from chopped, bondable low friction yarn which is made by twisting together filaments of low friction material with filaments of bondable material and by impregnating the yarn with bonding resin. Since the bondable and low friction materials are twisted together, they tend not to separate. Furthermore, the bondable and low friction materials are evenly distributed throughout the bearing. Thus, a low friction bearing is provided which is cohesive, strong, and long wearing.

The invention has been described with particular reference to the preferred embodiments, but it will be understood that variations and modifications within the spirit and scope of the invention may occur to those skilled in the art to which the invention pertains.

What I claim is:

1. A process for making a low friction bearing from filaments of bondable material and filaments of low friction material and bonding resin, said process comprising the steps of:

twisting together the filaments of bondable material and the filaments of low friction material to form a bondable low friction yarn;

impregnating said bondable low friction yarn with the bonding resin;

chopping said bondable low friction yarn; and placing said chopped and impregnated bondable low friction yarn into a mold cavity configured in the shape of the low friction bearing, and applying pressure to said yarn to mold said yarn to form the low friction bearing.

2. The process of claim 1, wherein said impregnating step comprises impregnating the bondable low friction yarn with a thermosetting resin in the B-stage.

3. The process of claim 1, wherein said impregnating step comprises impregnating the bondable low friction yarn with a thermoplastic resin.

4. The process of claim 1, wherein said chopping step comprises chopping the bondable low friction yarn into pieces of 1/16 to ¼ inch long.

5. The process of claim 1, wherein said twisting step comprises twisting together filaments of polyamide fiber and filaments of polytetrafluoroethylene to form a bondable low friction yarn.

6. The process of claim 5, wherein said impregnating step comprises impregnating the bondable low friction yarn with sufficient bonding resin to form an impregnated bondable low friction yarn which is 30% to 50% by weight of said resin and the remaining portion is 10% to 50% of polytetrafluoroethylene.

* * * * *